(12) United States Patent
Judd

(10) Patent No.: US 8,108,171 B2
(45) Date of Patent: Jan. 31, 2012

(54) SYSTEMS AND METHODS FOR CALIBRATION OF GYROSCOPES AND A MAGNETIC COMPASS

(75) Inventor: Tom Judd, Carlsbad, CA (US)

(73) Assignee: Honeywell International, Inc., Morristown, NJ (US)

( * ) Notice: Subject to any disclaimer, the term of this patent is extended or adjusted under 35 U.S.C. 154(b) by 367 days.

(21) Appl. No.: 12/558,889

(22) Filed: Sep. 14, 2009

(65) Prior Publication Data

US 2011/0066392 A1 Mar. 17, 2011

(51) Int. Cl.
*G06F 19/00* (2011.01)

(52) U.S. Cl. ............. 702/93; 702/82; 702/150; 73/1.76; 33/317 R; 33/321; 33/326; 33/356; 33/361; 324/246; 701/216; 701/217

(58) Field of Classification Search .................... 702/82, 702/92, 93, 94, 95, 104, 141, 150, 151; 73/493, 73/495, 498, 1.76; 33/317 R, 318, 321, 326, 33/648, 647, 327, 356, 361; 244/175, 183, 244/185, 197; 701/216, 217, 200, 224; 324/246
See application file for complete search history.

(56) References Cited

U.S. PATENT DOCUMENTS

| | | | | |
|---|---|---|---|---|
| 4,091,543 A | * | 5/1978 | Lapeyre | 33/356 |
| 4,143,467 A | * | 3/1979 | Erspamer et al. | 33/356 |
| 4,218,827 A | * | 8/1980 | Huvers | 33/318 |
| 4,338,810 A | * | 7/1982 | Gollomp | 73/1.76 |
| 4,347,730 A | | 9/1982 | Fisher et al. | |
| 4,414,753 A | * | 11/1983 | Moulin et al. | 33/356 |
| 4,539,760 A | | 9/1985 | Marchent et al. | |
| 4,698,912 A | | 10/1987 | Fowler et al. | |
| 5,345,382 A | * | 9/1994 | Kao | 702/104 |
| 5,374,933 A | | 12/1994 | Kao | |
| 5,440,484 A | * | 8/1995 | Kao | 701/207 |
| 6,009,629 A | | 1/2000 | Gnepf et al. | |
| 6,408,251 B1 | * | 6/2002 | Azuma | 702/92 |
| 6,577,976 B1 | * | 6/2003 | Hoff et al. | 702/95 |
| 6,647,352 B1 | | 11/2003 | Horton | |
| 6,853,947 B1 | | 2/2005 | Horton | |
| 6,918,186 B2 | | 7/2005 | Ash et al. | |
| 7,259,550 B2 | * | 8/2007 | Bergsma | 324/202 |
| 7,275,008 B2 | | 9/2007 | Plyvanainen | |
| 7,937,217 B2 | * | 5/2011 | Okeya | 701/207 |
| 7,941,268 B2 | * | 5/2011 | Okeya | 701/207 |
| 2004/0020064 A1 | | 2/2004 | Levi et al. | |
| 2004/0186676 A1 | | 9/2004 | Liu et al. | |
| 2005/0099177 A1 | | 5/2005 | Greelish | |
| 2005/0227775 A1 | | 10/2005 | Cassady et al. | |
| 2007/0055468 A1 | | 3/2007 | Pylvanainen | |
| 2008/0046214 A1 | | 2/2008 | Fowler | |

OTHER PUBLICATIONS

Judd, "U.S. Appl. No. 12/558,871: System and Methods for Gyroscope Calibration", Sep. 14, 2009.
"Handbook of Magnetic Compass Adjustment", 2004, Publisher: National Geospatial-Intelligence Agency , Published in: Bethesda, MD.
European Patent Office, "European Search Report", Dec. 1, 2010, Published in: EP.

* cited by examiner

*Primary Examiner* — Carol Tsai
(74) *Attorney, Agent, or Firm* — Fogg & Powers LLC

(57) ABSTRACT

Calibration systems and methods simultaneously calibrate a magnetic compass and gyroscopes. An exemplary embodiment rotates the field calibration system. Based upon the rotation sensed by the magnetic compass and the gyroscopes, the field calibration system determines compensation for both the magnetic compass and the gyroscopes.

14 Claims, 3 Drawing Sheets

SYSTEMS AND METHODS FOR CALIBRATION OF GYROSCOPES AND A MAGNETIC COMPASS

BACKGROUND OF THE INVENTION

Magnetic compasses are employed in a variety of position and/or orientation sensing systems. One or more magnetometers may be used in the compass. Calibration of the magnetic compass is relatively straightforward in a controlled test environment where a calibration rotation can be precisely controlled. However, when the magnetic compass is deployed in the field, the accuracy of the magnetic compass may be degraded.

The device in which the magnetic compass resides may contain metals or other magnetic materials which alter the magnetic field in the vicinity of the magnetic compass. For example, the magnetic compass may be installed in a vehicle, such as an aircraft, ship, or military tank. Thus, if the magnetic compass is calibrated prior to installation in a device and/or deployment in the field, the magnetic fields altered by the nearby metals or the other magnetic materials may introduce error into the magnetic compass bearing readings.

If the magnetic compass is installed in a portable device, external metals or other magnetic materials which come into proximity of the magnetic compass may further alter the magnetic field in the vicinity of the magnetic compass. That is, the magnetic fields in the vicinity of the magnetic compass may change as a device or a vehicle in which the magnetic compass is deployed is moved. Accordingly, moving the magnetic compass into the vicinity of external metals or other magnetic materials may introduce error into the magnetic compass bearing readings.

For example, the magnetic compass may be installed in a portable device that may be conveniently carried on a person, such as when attached to clothing or placed in a back pack. Metal camping gear or munitions carried by the person may alter the magnetic field in the vicinity of the magnetic compass. If the person is a soldier, the person's metal protective headgear (e.g., a helmet) may further alter the magnetic field in the vicinity of the magnetic compass. When the headgear is put on or removed, and/or as munitions are added or used, the magnetic field in the vicinity of the magnetic compass may change. Thus, the accuracy of the magnetic compass may be changed.

Accordingly, it may be desirable to recalibrate the magnetic compass on a periodic basis, prior to use, during use, and/or after some event. For example, recalibration may be desirable after batteries containing ferromagnetic materials (casing or leads) have been changed. As another example, recalibration may be desirable after the soldier has geared up for field deployment. Thus, it is desirable to recalibrate in the field so that the magnetic compass provides accurate bearing information for the particular location and/or environment that it is to be used.

Often, one or more gyroscopes (and/or accelerometers) will be deployed with the magnetic compass. Gyroscope may also be inaccurate during use in the field. For example, gyroscopes are subject to drift rates. Accordingly, it may also be desirable to field calibrate the gyroscopes along with the recalibration of the magnetic compass.

SUMMARY OF THE INVENTION

Systems and methods of simultaneously calibrating a compass and gyroscopes in the field are disclosed. The field calibration begins by rotating the field calibration system. Based upon the rotation sensed by the magnetic compass and the gyroscopes, the field calibration system determines compensation for both the magnetic compass and the gyroscopes.

BRIEF DESCRIPTION OF THE DRAWINGS

Preferred and alternative embodiments are described in detail below with reference to the following drawings.

DETAILED DESCRIPTION OF THE PREFERRED EMBODIMENT

Figure 1:
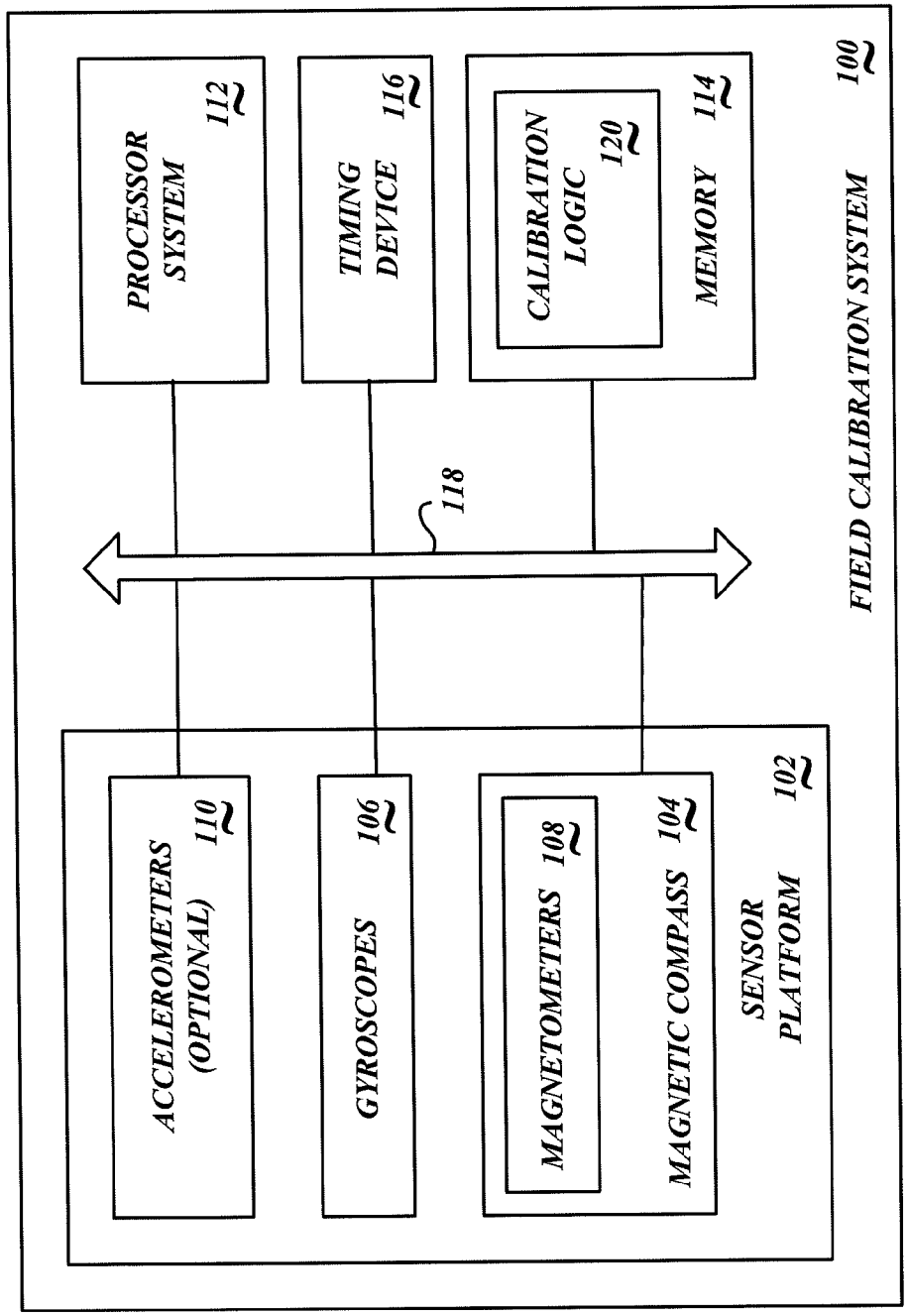
FIG. 1 is a block diagram of an embodiment of the field calibration system.

FIG. 1 is a block diagram of an embodiment of a field calibration system 100. An exemplary embodiment of the field calibration system 100 includes a sensor platform 102 with a magnetic compass 104 and a plurality of gyroscopes 106 thereon. An exemplary magnetic compass 104 may include one or more magnetometers 108. Further, an optional plurality of accelerometers 110 may be included on the sensor platform 102.

During calibration, the sensor platform 102 is rotated in three dimensional space, referred to herein interchangeably as a calibration rotation. Preferably, the sensor platform 102 is rotated at least 360°. The x-y plane of the sensor platform 102 may be oriented in a horizontal position or a tilt position during the calibration rotation.

The field calibration begins by rotating the field calibration system 100. Based upon the rotation sensed by the magnetic compass 104 and the gyroscopes 106, the field calibration system 100 determines compensation for both the magnetic compass 104 and the gyroscopes 106.

The exemplary field calibration system 100 further includes a processor system 112, a memory 114, and a timer device 116. The magnetic compass 104, the gyroscopes 106, the accelerometers 110, the processor system 112, the memory 114, and the timer device 116 are communicatively coupled to a communication bus 118, thereby providing connectivity to the above-described components. In alternative embodiments of the field calibration system 100, the above-described components may be communicatively coupled to each other in a different manner. For example, one or more of the above-described components may be directly coupled to the processor system 112, or may be coupled to the processor system 112 via intermediary components (not shown).

The memory 114 includes a region where the calibration logic 120 is stored. The processor system 112 retrieves and executes the calibration logic 120 to determine the bias compensation and/or the gain compensation for the magnetic compass 104 and the gyroscopes 106.

The timer device 116 may be any suitable device that provides the times of the rotation of the sensor platform 102 during a calibration rotation. The timer device 116 may provide time information based on real time, or may simply measure relative periods of time during the calibration rotation. Further, the timer device 116 may be part of another system or component.

The timer device 116 provides the time information to the processor system 112. The time information is used, in part, to integrate the rotations sensed by the gyroscopes 106. Integration of the rotation information provided by the gyroscopes 106 is used to determine an angular change in the orientation of the sensor platform 102 during the calibration rotation.

Figure 2:
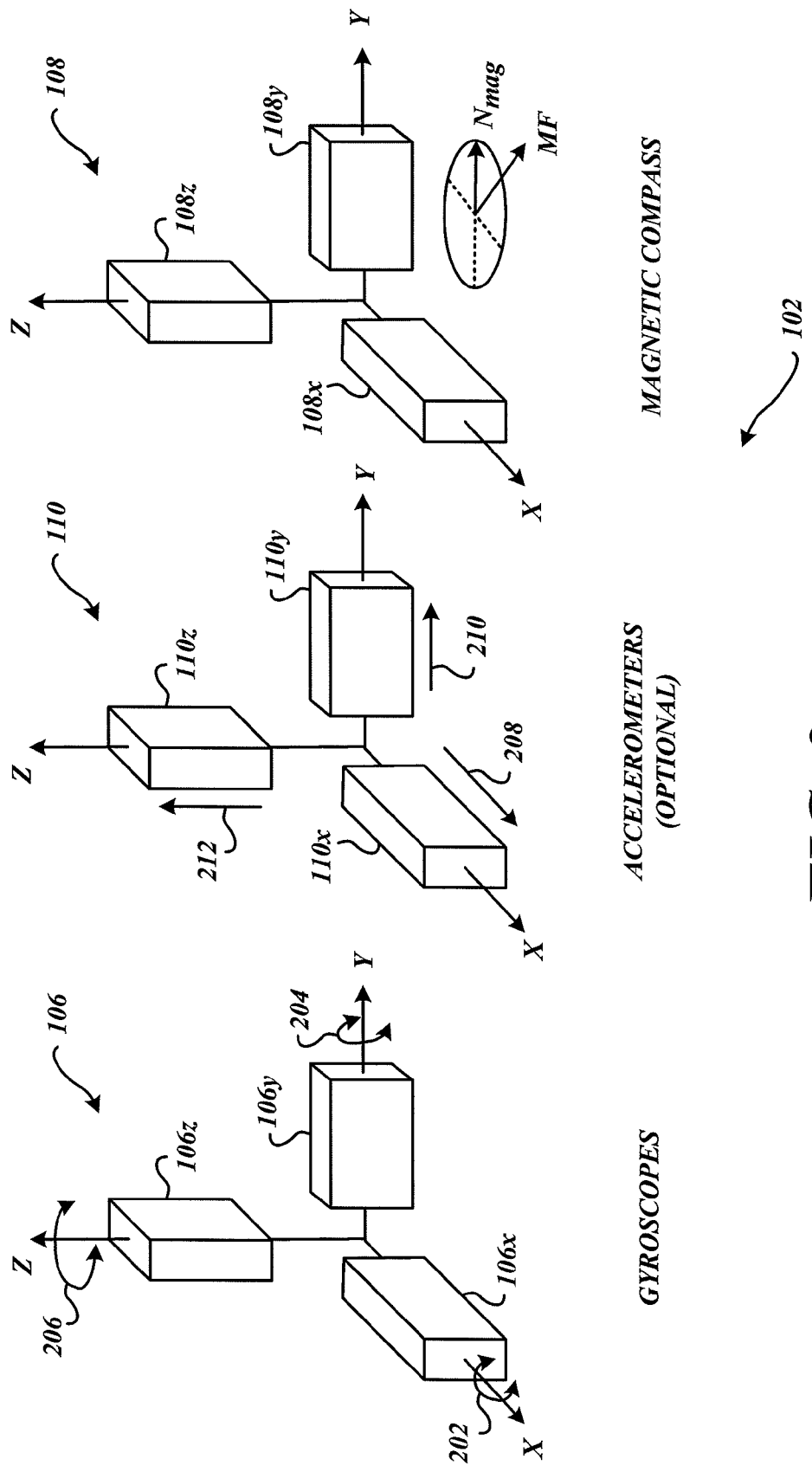
FIG. 2 is a conceptual perspective view of the orientation of the gyroscopes, the accelerometers, and the magnetometers in an exemplary embodiment of the field calibration system.

FIG. 2 is a conceptual perspective view of the orientation of the magnetic compass 104, the magnetometers 108, the gyroscopes 106, and the optional accelerometers 110 in an exemplary embodiment of the field calibration system 100. In this embodiment, three magnetometers 108x, 108y, and 108z are orthogonally mounted on the sensor platform 102 and oriented along the x-axis, the y-axis, and the z-axis, respectively. Additionally, three gyroscopes 106x, 106y, and 106z, and three accelerometers 110x, 110y, and 110z, are orthogonally mounted on the sensor platform 102. Other embodiments include less than, or more than, the illustrated three gyroscopes 106, the illustrated three accelerometers 110, and/or the illustrated three magnetometers 108. Further, in alternative embodiments, the gyroscopes 106, the accelerometers 110, and/or the magnetometers 108 may be mounted on the sensor platform 102 in other independent orientations.

The exemplary gyroscopes 106x, 106y, and 106z, are operable to sense rotation about the x-axis, the y-axis, and the z-axis, respectively (as denoted by the illustrated direction arrows 202, 204, and 206, respectively). The optional accelerometers 110x, 110y, and 110z sense a linear acceleration along the x-axis, the y-axis, and the z-axis, respectively (as denoted by the illustrated direction arrows 208, 210, and 212, respectively). The exemplary magnetometers 108x, 108y, and 108z, sense orientation of the earth's magnetic field (as denoted by the illustrated direction arrow MF), from which a magnetic north vector (Nmag) may be determined from the accelerometers 106x, 106y, and 106z, and from the magnetometers 108x, 108y, and 108z.

In an exemplary embodiment, the calibration begins with determining the bias error of the gyroscopes 106. When the sensor platform 102 is stationary, the output of the gyroscopes 106 should be null (zero). That is, if the gyroscopes 106 are not rotating, their output should be zero. If the output from the gyroscopes 106 is a non-null value, an amount of bias error compensation is determined. Thus, the bias error corresponds to the non-null output of a stationary gyroscope 106.

In some embodiments, the processor system 112 provides a control signal to those gyroscopes 106 having the non-null output so that their output is adjusted to a null value. That is, the field calibration system 100 adjusts the bias of the gyroscopes 106 so that the output will be zero when the gyroscopes 106 are stationary. In other embodiments, a value of the bias error and/or the bias error compensation is stored in the memory 114 such that the processor system 112 may later adjust rotation information received from the gyroscopes 106 to compensate the received information for the determined bias error.

Once we have compensated for the gyro bias we can focus on the gyro gain. We use an uncalibrated compass to aid in the gyro calibration. A key observation is that even though the compass is uncalibrated, the compass can still be used to mark positions. We take whatever reading the compass provides us, knowing it might be in error, and spin around (rotate the compass) until we observe the same reading on the compass a second time. A full rotation of the compass, between the two readings, corresponds to exactly 360 degrees of rotation. Therefore, the gyro sensor should have integrated to 360 degrees for the same rotation. If not, then a basis for the gyro is determinable and may be used for adjusting the gyro gain.

In a sampled system, it would be fortuitous that the first and last azimuth samples were exactly aligned. It would be expected in this calibration to interpolate both gyro and azimuth samples to align the beginning and end of a 360 degree rotation.

A calibration rotation is performed on the field calibration system 100 by rotating the sensor platform 102 at least 360 degrees. In the field, it may be difficult to rotate the sensor platform 102 in a horizontal plane (e.g., the x-y plane). When a plurality of gyroscopes 106 are available, the rotation information may be used to determine rotation information when the sensor platform 102 is rotated in a tilted orientation (out-of-plane from the x-y plane).

During the calibration rotation, output information corresponding to the rotation sensed by the gyroscopes 106 is received for processing by the processor system 112. The gyroscope rotation information may be stored in the memory 114.

Also during the calibration rotation, output information corresponding to the time of the calibration rotation is received from the timing device 116 for processing by the processor system 112. For example, the start time and the end time of the calibration rotation may be received from the timing device 116. The time information may be received on a continuous basis, on a periodic basis, or at selected intervals. The time information may be stored in the memory 114.

Also, output information corresponding to the bearing (direction) of the sensor platform 102 during the calibration rotation is received from the magnetic compass 104 for processing by the processor system 112. The bearing information may be received on a continuous basis, on a periodic basis, or at selected intervals. The bearing information may stored in the memory 114.

At this stage of the calibration process, the magnetic compass 104 has not yet been calibrated. Accordingly, the accuracy of the bearing information received from the uncalibrated magnetic compass 104 with respect to the magnetic north bearing is not known. That is, the bearing information received from the uncalibrated magnetic compass 104 may or may not be accurately indicating the bearing of magnetic north. Thus, embodiments of the field calibration system 100 are tracking and/or recording azimuth information that is not referenced to a known bearing.

A complete turn corresponding to 360 degrees of rotation, even for an uncalibrated magnetic compass, is known when the compass passes the same position a second time when rotated. Therefore, an uncalibrated compass can be used to determine exactly when the platform has rotated 360 degrees. The integrated gyro should also be 360 degrees. If it is not, then a gain adjustment can be determined and applied to calibrate the gyro.

The processor system 112 integrates the rotation information received from the gyroscopes 106, based upon the time information received by the timing device 116, to determine an amount of angular rotation. The amount of angular rotation may be determined based upon the start and end times of the calibration rotation. Alternatively, or additionally, incremental amounts of angular rotation may be determined by integrating the rotation information over selected time periods.

In some embodiments, the comparison of the amount of angular rotation with the measured bearing information is performed on an incremental time basis. That is, for a plurality of increment time periods, the amount of angular rotation for the selected time increment is determined by integration based upon the time information received from the timer device 116. Incremental amounts of angular rotation is compared to the measured bearing information from the magnetic compass 104 for that same time increment. Thus, an incremental gain error is determinable. Incremental gain errors may be determined and correlated with each other in any suitable manner. For example, a series of time increments may be considered. Alternatively, or additionally, a running average or sliding window approach may be used to correlate the integrated rotation information from the gyroscopes 106 with the measured bearing information from the magnetic compass 104.

It is appreciated that if there is no tilt, or substantially no tilt, in the sensor platform 102 during the calibration rotation (that is, the calibration rotation occurs along the x-y plane), the gain error will be determined for the gyroscope 106z. If there is some amount of tilt in the sensor platform 102 during the calibration rotation, the other gyroscopes 106x and 106y will sense some amount of rotation. If the tilt is relatively small, the rotation sensed by the gyroscopes 106x and 106y may be disregarded.

If the amount of tilt in the sensor platform 102 is significant, gain error may also be determined for the gyroscopes 106x and 106y. Further, if the magnetic compass 104 has a plurality of magnetometers 108, information from the plurality of magnetometers may be used to determine gain error for each of the gyroscopes 106x, 106y, and/or 106z. For example, if the sensor platform 102 is in a backpack worn by a person, it may be desirable to have the person lean over during the calibration rotation. That is, the leaning introduces tilt into the orientation of the sensor platform 102, and the corresponding rotation of the tilted person (corresponding to a calibration rotation) carrying the sensor platform 102 can provide information to determine the gain error of the gyroscopes 106.

As noted herein, the uncalibrated magnetic compass 104 is calibrated based upon the rotation information from the gyroscopes 106 received during the calibration rotation. That is, a single calibration rotation may be used to calibrate the magnetic compass 104 and the gyroscopes 106.

The processor system 112 determines the magnetic error and the angle error. Magnetic error corresponds to the variation of the magnetic field strength as a function of angle. When the calibration rotation is performed, the magnetic field strength in the vicinity of the sensor platform 102 should be substantially constant. That is, nearby external metals or other magnetic materials should not substantially change the magnetic field strength while the sensor platform 102 is rotated during the calibration rotation. Metals or other magnetic materials of the device or vehicle that the sensor platform 102 is deployed in, which will also rotate during the calibration rotation, should not substantially change the magnetic field strength during the calibration rotation.

The information received from the gyroscopes 106 may be used to determine magnetic field strength variations during the calibration rotation. The magnetic field strength variation information may be input into an angle error model. For example, a five parameter angle error model as disclosed in "Handbook of Magnetic Compass Adjustment" may be used. A least squares analysis method may be used to determine gain error of the gyroscopes 106 under the restriction that the vector magnitude of the magnetic field strength be a constant.

As an example, if the rotation information from the gyroscopes 106 indicates that the calibration rotation was 358 degrees in view of an actual rotation of 360 degrees, then gain error of the gyroscopes 106 can be corrected by multiplying the output of the gyroscope 106 by 360/358.

In some embodiments, a second calibration rotation is performed. The resultant compensation information determined for the magnetic compass 104 and the gyroscopes 106 during the second calibration rotation are compared to the compensation information for the magnetic compass 104 and the gyroscopes 106 determined from the first calibration rotation. The comparison may be used to correct and/or verify the determined compensation information.

In some embodiments, the second calibration rotation is substantially in an opposite direction from the first calibration rotation. For example, the first calibration may be in a clockwise direction (in view of any tilt for the first calibration rotation). Then, the second calibration may be in a counterclockwise direction (in view of any tilt for the second calibration rotation).

As an example where two calibration rotations in opposite spin directions are used, suppose the first calibration rotation is clockwise and the rotation information from the gyroscopes 106 indicates a rotation of 356 degrees. Then suppose the second calibration rotation is counterclockwise and the rotation information from the gyroscopes 106 indicates a rotation of 362 degrees. The average gain would be determined as (362+356)/2=359. Thus, the modified gain is equal to 360/359. In addition, there is a three degree bias. Accordingly, in one direction, gain reduces the readings from the gyroscopes 106. In the opposite, gain increases the readings. The gyroscopes 106 produce the above-described readings even if the bias is not correct. Here, the three degrees may be divided by the sample time to get the bias rate for the gyroscopes 106. For example, if the calibration rotations time took 10 seconds for rotation in each direction, then the correction to bias in this case would be 0.3 degrees per second.

As noted herein, field calibration may present difficulties in data acquisition that cannot be resolved by prior art calibration systems. For example, when the device is carried by a person, user motion may cause collection of noisy data from the magnetic compass 104 and the gyroscopes 106. Embodiments may over-sample the data and reduce the contribution from the noise by averaging the over-sampled data.

Embodiments determine compensation information for a tilted calibration rotation (the calibration rotation in three dimensions) by subtracting off a bias from each of the three magnetometers 108a, 108y, and 108z. Then, the resulting vector magnetometer outputs are multiplied by a 3×3 correction matrix. A total of twelve parameters need to be determined. Because of the non-linear nature of the output form the magnetometers 108a, 108y, and 108z, the bias values may be solved iteratively. Thus, an initial guess or approximation is made for the parameters. The parameters are then varied until the determined error measure is at a minimum.

A first measure of the error is $M_i^2=(D_i-D_{avg})^2$, where $D_{avg}$ is the average length of the magnetic field vector over all the samples, and where $D_i$ is the length of a single sample. All of the errors are summed ($S_1=\Sigma_i M_i^2$). A second measure of error is obtained from the gyroscopes 106. For each sampled time interval during the calibration rotation, the change in the azimuth as reported by the gyroscopes 106, versus the change in the azimuth as reported by the magnetometers 108, is calculated. The reading errors O may be determined in accordance with $O_i^2=(dA_i-dY_i)^2$, where $dA_i$ is the change in the magnetic azimuth over one sample interval, and $dY_i$ is the corresponding change in the gyroscope's azimuth. All the errors $S_2=\Sigma_i O_i^2$ are summed. The total error is $S_T=S_1+S_2$. The parameters are varied until $S_T$ is a minimum.

As noted herein, with person-mounted sensors, it may be relatively impractical to perform calibration rotations by spinning on all three axes. That is, it may be difficult to rotate the sensor platform 102 along the x-axis and the y-axis when the sensor platform 102 is carried by a person. Accordingly, the process of calculating gyroscope gain errors is modified. Initially, the three biases for the three gyroscopes 106x, 106y, and 106z are zeroed. Then, a two dimensional (2D) calibration rotation is performed around a single vertical axis using an out-of-plane motion, as would be expected for a user on foot who is leaning over during the calibration rotation. The start angle and the stop angle are computed from the magnetic vectors determined from bearing information provided by the uncalibrated magnetic compass 104. The magnetic vector rotation is determined from the rotation information provided by the gyroscopes 106. The magnetic vector rotations will, in general, have some component around all three axes. However, the major magnetic vector rotation contribution will still be around the vertical axis.

In some embodiments, once the user has completed a first tilted 360° calibration rotation, the gain for the gyroscope 106z is modified. Gain errors from uncalibrated gyroscopes 106x and 106y on the other two axes may be ignored since their contribution to the determined magnetic vector will be relatively small. For example, if the gains were off by as much as 5 percent, the peak error in the determined azimuth would be around one degree, assuming a 60 degree dip angle in the magnetic field. Accordingly, the average error in the determined magnetic vector would be a fraction of a degree.

Figure 3:
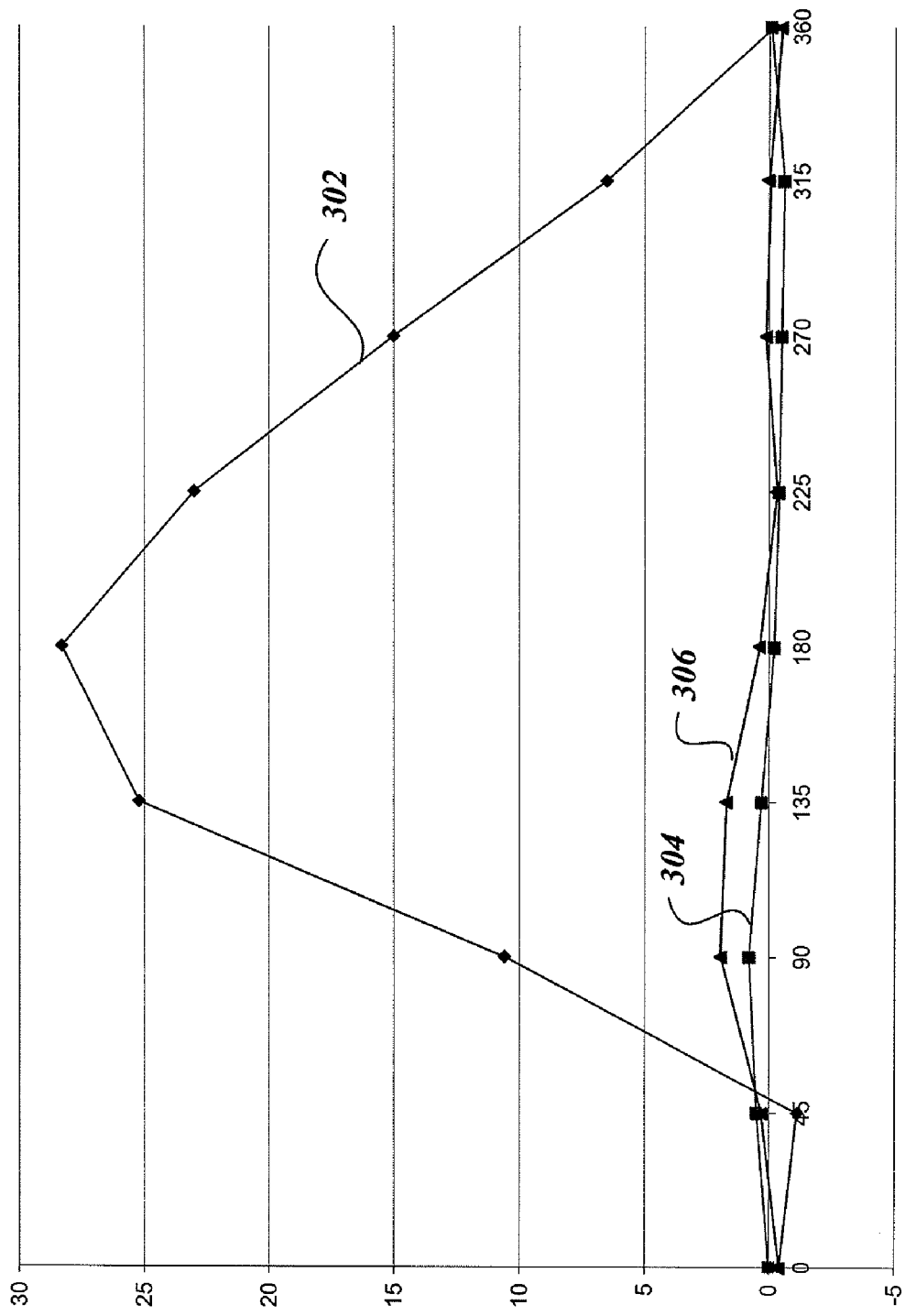
FIG. 3 illustrates plots of the degrees of error between a tested uncalibrated compass and two calibrated compasses.

FIG. 3 illustrates plots of the degrees of error between a tested uncalibrated compass and two calibrated compasses. The plot 302 illustrates error for an uncalibrated compass prior to calibration. The plot 304 illustrates test results of a compass calibrated by an embodiment of the field calibration system 100 when the calibration rotation was performed by a person holding and rotating the sensor platform 102 using their hands. The plot 306 illustrates test results of a compass calibrated by an embodiment of the field calibration system 100 when the calibration rotation was performed when the sensor platform 102 was strapped to a person who rotated their body while leaning.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for calibrating an uncalibrated magnetic compass and at least one uncalibrated gyroscope, the method comprising:
   receiving an output of the uncalibrated gyroscope while stationary;
   determining a gyroscope bias error of the uncalibrated gyroscope based upon the output of the uncalibrated gyroscope while stationary;
   rotating a sensor platform with the uncalibrated magnetic compass and the uncalibrated gyroscope thereon;
   receiving bearing information from the uncalibrated compass and angular rotation information from the uncalibrated gyroscope during a time period corresponding to the rotation of the sensor platform exactly 360 degrees;
   integrating the angular rotation information from the uncalibrated gyroscope over the time period;
   determining an amount of gyroscope rotation from the integrated angular rotation information;
   determining a gyroscope gain error based upon a difference between the determined amount of gyroscope rotation and the corresponding bearing information;
   determining magnetic field strength variations based upon the angular rotation information; and
   determining a compass bearing error based upon the determined magnetic field strength variations.

2. The method of claim 1, further comprising:
   compensating the uncalibrated compass according to the determined compass bearing error; and
   compensating the uncalibrated gyroscope according to the gyroscope bias error and the gyroscope gain error.

3. The method of claim 1, further comprising:
   rotating the sensor platform by a known amount of angular degrees.

4. The method of claim 3, wherein the known amount of angular degrees that the sensor platform is rotated substantially equals 360 degrees.

5. The method of claim 1, further comprising:
   determining an amount of angular degrees of rotation of the sensor platform based upon the bearing information.

6. The method of claim 1, wherein rotating the sensor platform corresponds to a first calibration rotation, wherein the determined amount of gyroscope rotation is a first amount of gyroscope rotation corresponding to the first calibration rotation, and further comprising:
   rotating the sensor platform during a second calibration rotation;
   receiving second bearing information from the uncalibrated compass and second angular rotation information from the uncalibrated gyroscope during a second time period corresponding to the second calibration rotation;
   integrating the second angular rotation information from the uncalibrated gyroscope over the second time period;
   determining a second amount of gyroscope rotation from the integrated second angular rotation information over the second time period; and
   determining the gyroscope gain error from the first amount of gyroscope rotation and the second amount of gyroscope rotation.

7. The method of claim 6, wherein a direction of the second calibration rotation is substantially in an opposite direction of the first calibration rotation.

8. The method of claim 1, further comprising:
   measuring the time period of the rotation of the sensor platform.

9. The method of claim 1, further comprising:
   measuring a plurality of incremental time periods corresponding to the time period of the rotation of the sensor platform.

10. A compass and gyroscope field calibration system comprising:
    a sensor platform;
    at least one uncalibrated magnetic compass on the sensor platform and configured to output bearing information corresponding to a bearing of the uncalibrated magnetic compass;
    at least one uncalibrated gyroscope on the sensor platform and configured to sense a rotation of the sensor platform during a calibration rotation of the sensor platform; and
    a processor system operable to:
       receive an output of the uncalibrated gyroscope while the uncalibrated gyroscope is stationary;
       determine a gyroscope bias error of the uncalibrated gyroscope based upon the output of the uncalibrated gyroscope while stationary;
       receive the bearing information from the uncalibrated compass and angular rotation information from the uncalibrated gyroscope during a time period corresponding to the calibration rotation of the sensor platform;
       integrate the angular rotation information from the uncalibrated gyroscope over the time period;
       determine an amount of gyroscope rotation from the integrated angular rotation information;

determine a gyroscope gain error based upon a difference between the determined amount of gyroscope rotation and the corresponding bearing information;
determining magnetic field strength variations based upon the angular rotation information; and
determining a compass bearing error based upon the determined magnetic field strength variations.

11. The system of claim 10, further comprising:
a timer device configured to provide time information to the processor system, wherein the angular rotation information is integrated based upon the provided time information.

12. The system of claim 10, wherein the at least one uncalibrated gyroscope is a first uncalibrated gyroscope oriented along a z-axis of the sensor platform, wherein the uncalibrated compass is oriented on an x-y plane of the sensor platform, and further comprising:
    a second uncalibrated gyroscope oriented on the x-y plane of the sensor platform.

13. A system for calibrating an uncalibrated magnetic compass and at least one uncalibrated gyroscope from a rotation of a sensor platform with the uncalibrated magnetic compass and the uncalibrated gyroscope thereon, the method comprising:

means for receiving bearing information from the uncalibrated compass and angular rotation information from the uncalibrated gyroscope during a time period corresponding to the rotation of the sensor platform; and
means for integrating the angular rotation information from the uncalibrated gyroscope over the time period, determining an amount of gyroscope rotation from the integrated angular rotation information, determining a gyroscope gain error based upon a difference between the determined amount of gyroscope rotation and the corresponding bearing information, determining magnetic field strength variations based upon the angular rotation information, and determining a compass bearing error based upon the determined magnetic field strength variations.

14. The system of claim 13, further comprising:
means for receiving an output of the uncalibrated gyroscope while stationary; and
means for determining a gyroscope bias error of the uncalibrated gyroscope based upon the output of the uncalibrated gyroscope while stationary.

\* \* \* \* \*